Patented Nov. 21, 1922.

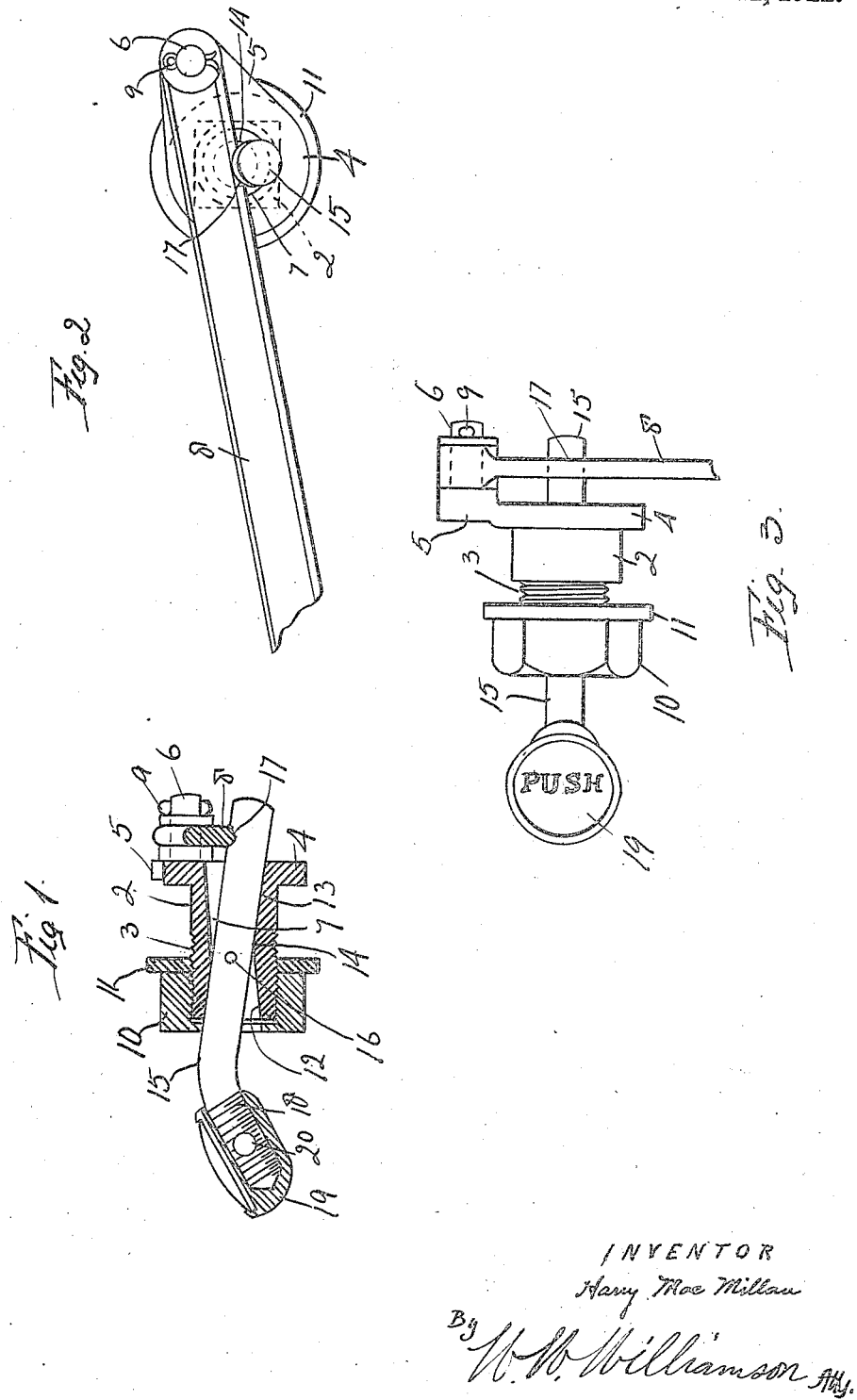

1,436,628

UNITED STATES PATENT OFFICE.

HARRY MacMILLAN, OF PHILADELPHIA, PENNSYLVANIA.

FLUSH-TANK-OPERATING LEVER.

Application filed April 15, 1922. Serial No. 553,225.

*To all whom it may concern:*

Be it known that I, HARRY MACMILLAN, a citizen of the United States, residing at Philadelphia, in the county of Philadelphia and State of Pennsylvania, have invented new and useful Improvements in a Flush-Tank-Operating Lever, of which the following is a specification.

My invention relates to improvements in a flush tank operating lever, and has for its object to provide an exceedingly simple and effective device of this character which will have few parts and therefore be compact, which will be strong and durable and also positive in its action.

Another object of this invention is to so locate the fulcrum of the push lever relative to the other elements that the chances of the parts being thrown out of alignment will be reduced to a minimum.

A further object of the invention is to construct a flush tank lever which may be readily and easily installed consisting of a nipple having a bore flared in opposite directions to produce a fulcrum ledge, a push lever passing through said bore and resting on the fulcrum ledge, a trunnion offset from the bore of the nipple and on which is pivoted the ball or flush lever and a nut having threaded connection with the nipple to secure the parts in place on a flush tank.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a longitudinal sectional elevation of a flush tank operating lever embodying my invention.

Fig. 2, is an inner end view thereof with a portion of the ball or flush lever broken away.

Fig. 3, is a plan view thereof.

In carrying out my invention as herein embodied, 2 represents a nipple adapted to be passed through a hole in the front wall of a flush tank for toilets and the like. The outer end of this nipple is externally threaded as at 3 while the inner end has a flange 4 with an extension 5. The extension 5 carries a trunnion 6 which is offset to one side of a bore 7 through the nipple and is preferably located in a plane above the inner end of said bore.

On the trunnion is pivotally mounted a flush lever 8 held in place by a cotter pin 9 or its equivalent. After the nipple has been passed through the wall of the tank it is held in place by a nut 10 having threaded connection with the outer end thereof with a washer 11 interposed between the nut and the outer surface of the tank.

The bore 7 of the nipple 2 is flared outward in opposite directions toward each end as indicated at 12 and 13 thus producing a fulcrum ledge 14 intermediate the ends of the nipple and preferably nearer the outer end than the inner or flanged end.

Within the bore is located a push lever 15 fulcrumed upon the fulcrum ledge 14 and having both ends projecting beyond the ends of the nipple, a pin 16 which passes through the push lever 15 and set in large holes in the nipple being inset only to prevent accidental displacement of the push lever.

The inner end of the push lever is notched, as at 17, in which the push lever 8 rests so as not to slide out of place when the inner end of the push lever is inclined while the outer end of said push lever is bent downward to provide an oblique portion 18. An indicating button 19 has threaded connection with this oblique portion of the push lever and may be fixed in position by a pin 20 or its equivalent passing through a portion of the button and the push lever.

By pushing upon the button 19 the outer end of the push lever 15 will be depressed and cause it to rock upon the fulcrum ledge and thereby raise the inner end which will swing the flush lever 8 upward to disengage the flush valve from its seat as will be well understood.

Of course I do not wish to be limited to the exact details of construction as herein shown as these may be varied within the limits of the appended claims without departing from the spirit of my invention.

Having thus fully described my invention, what I claim as new and useful is:—

1. A flush tank operating lever comprising a nipple having a bore therethrough, said bore being flared outward in opposite directions toward the ends thereby producing a fulcrum ledge, a push lever positioned in the bore of said nipple with its ends projecting beyond the ends of the nipple and fulcrumed on said fulcrum ledge and a pivoted flush lever resting on the inner end of said push lever.

2. A flush tank operating lever comprising a nipple having a bore therethrough, said bore being flared outward in opposite directions toward the ends thereby producing a fulcrum ledge, a push lever positioned in the bore of said nipple with its ends projecting beyond the ends of the nipple and fulcrumed on said fulcrum ledge, means to prevent the accidental displacement of the push lever, a trunnion offset to one side and above the bore of the nipple and a flush lever having one end journalled on said trunnion and resting upon the inner end of the push lever.

3. A flush tank operating lever comprising a nipple having a bore therethrough, said bore being flared outward in opposite directions toward the ends thereby producing a fulcrum ledge, a push lever positioned in the bore of said nipple with its ends projecting beyond the ends of the nipple and fulcrumed on said fulcrum ledge, means to prevent the accidental displacement of the push lever, a flange on the inner end of the nipple, an extension on said flange, a trunnion carried by said extension and positioned to one side of and above the nipple bore, a flush lever journalled on said trunnion and resting in a notch in the inner end of the push lever, means to prevent the displacement of the flush lever, an indicating button having threaded connection with the outer end of the push lever, means to prevent its displacement and a nut having threaded connection with the outer end of the nipple.

In testimony whereof, I have hereunto affixed my signature.

HARRY MacMILLAN.